(12) United States Patent
Mishraky et al.

(10) Patent No.: US 11,386,408 B2
(45) Date of Patent: Jul. 12, 2022

(54) SYSTEM AND METHOD FOR NEAREST NEIGHBOR-BASED BANK ACCOUNT NUMBER VALIDATION

(71) Applicant: Intuit Inc., Mountain View, CA (US)

(72) Inventors: Elhanan Mishraky, Tel Aviv (IL); Yair Horesh, Tel Aviv (IL); Yehezkel Shraga Resheff, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/671,382

(22) Filed: Nov. 1, 2019

(65) Prior Publication Data

US 2021/0133709 A1 May 6, 2021

(51) Int. Cl.
| | |
|---|---|
| *G06Q 20/10* | (2012.01) |
| *G06Q 20/40* | (2012.01) |
| *G06Q 40/02* | (2012.01) |
| *G06Q 20/02* | (2012.01) |
| *G06Q 20/04* | (2012.01) |
| *G06Q 30/06* | (2012.01) |

(52) U.S. Cl.
CPC ........ *G06Q 20/108* (2013.01); *G06Q 20/02* (2013.01); *G06Q 20/042* (2013.01); *G06Q 20/105* (2013.01); *G06Q 20/40* (2013.01); *G06Q 30/06* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 6,278,701 B1* | 8/2001 | Ayyagari | H04W 52/267 370/335 |
| 8,775,341 B1* | 7/2014 | Commons | G06F 40/253 706/20 |
| 8,942,917 B2* | 1/2015 | Chrysanthakopoulos | G06F 16/7837 701/410 |
| 10,678,865 B1* | 6/2020 | Resheff | G06F 16/907 |
| 10,901,800 B2* | 1/2021 | Stocker | G06F 9/5066 |
| 10,983,674 B1* | 4/2021 | Neumann | G16H 50/70 |
| 2005/0159996 A1* | 7/2005 | Lazarus | G06Q 30/0207 705/7.31 |
| 2005/0286665 A1* | 12/2005 | Resheff | H04B 7/10 375/350 |
| 2006/0058102 A1* | 3/2006 | Nguyen | G07F 17/323 463/39 |
| 2007/0100650 A1* | 5/2007 | Ramer | G06Q 30/0601 705/26.1 |
| 2007/0100651 A1* | 5/2007 | Ramer | G06Q 40/04 705/37 |

(Continued)

OTHER PUBLICATIONS

G. H. Chen and D. Shah. Explaining the Success of Nearest Neighbor Methods in Prediction. Foundations and Trends in Machine Learning, vol. 10, No. 5-6, (Nearest Neighbor) (Year: 2018).*

(Continued)

*Primary Examiner* — Chikaodinaka Ojiaku
(74) *Attorney, Agent, or Firm* — DLA Piper LLP (US)

(57) ABSTRACT

Systems and methods that may be configured to implement a nearest neighbor-based bank account validation process that may be used with electronic payments, transactions and or services.

20 Claims, 6 Drawing Sheets

(56) References Cited

U.S. PATENT DOCUMENTS

| | | | | |
|---|---|---|---|---|
| 2007/0100805 A1* | 5/2007 | Ramer | | G06F 16/951 |
| 2007/0118533 A1* | 5/2007 | Ramer | | G06F 16/9535 |
| 2007/0168354 A1* | 7/2007 | Ramer | | G06Q 30/06 |
| 2007/0231921 A1* | 10/2007 | Roder | | G06K 9/6276 |
| | | | | 436/173 |
| 2008/0242279 A1* | 10/2008 | Ramer | | G06F 16/951 |
| | | | | 707/E17.108 |
| 2009/0089279 A1* | 4/2009 | Jeong | | G06F 16/353 |
| | | | | 707/999.005 |
| 2010/0030578 A1* | 2/2010 | Siddique | | H04W 4/00 |
| | | | | 705/26.1 |
| 2010/0302000 A1* | 12/2010 | Szymkowiak | | C04B 41/4922 |
| | | | | 340/5.82 |
| 2012/0223894 A1* | 9/2012 | Zhao | | G06F 3/0488 |
| | | | | 345/173 |
| 2013/0215116 A1* | 8/2013 | Siddique | | G06Q 20/40 |
| | | | | 705/26.7 |
| 2014/0153787 A1* | 6/2014 | Schmidtler | | G06V 30/416 |
| | | | | 382/112 |
| 2014/0188701 A1* | 7/2014 | Sreedhararaj | | G06Q 20/0425 |
| | | | | 705/39 |
| 2014/0188726 A1* | 7/2014 | Vasantham | | G06Q 20/12 |
| | | | | 705/44 |
| 2014/0279319 A1* | 9/2014 | Bushpala | | G06Q 30/04 |
| | | | | 705/34 |
| 2014/0337948 A1* | 11/2014 | Hoyos | | H04L 63/0861 |
| | | | | 726/7 |
| 2015/0156186 A1* | 6/2015 | Jeffrey | | H04N 21/8358 |
| | | | | 713/168 |
| 2015/0302571 A1* | 10/2015 | Lambert | | G06F 16/5854 |
| | | | | 382/115 |
| 2015/0339782 A1* | 11/2015 | Fondekar | | G06F 16/00 |
| | | | | 705/30 |
| 2015/0347734 A1* | 12/2015 | Beigi | | H04L 9/3268 |
| | | | | 726/28 |
| 2016/0057138 A1* | 2/2016 | Hoyos | | G06V 40/168 |
| | | | | 726/7 |
| 2016/0072800 A1* | 3/2016 | Soon-Shiong | | H04L 63/0861 |
| | | | | 726/7 |
| 2016/0330084 A1* | 11/2016 | Hunter | | H04L 47/2425 |
| 2017/0041454 A1* | 2/2017 | Nicholls | | H04L 41/5019 |
| 2017/0111359 A1* | 4/2017 | Zizi | | H04L 63/0815 |
| 2017/0235625 A1* | 8/2017 | Ofer | | G06F 11/0787 |
| | | | | 714/37 |
| 2018/0053160 A1* | 2/2018 | Schwartz | | G06Q 20/389 |
| 2018/0232715 A1* | 8/2018 | Continanza | | G06Q 20/227 |
| 2018/0268015 A1* | 9/2018 | Sugaberry | | G06Q 10/067 |
| 2019/0004875 A1* | 1/2019 | Ofer | | G06F 9/542 |
| 2019/0236470 A1* | 8/2019 | Chauhan | | G06N 5/047 |
| 2019/0238549 A1* | 8/2019 | Chauhan | | H04L 63/101 |
| 2019/0377819 A1* | 12/2019 | Filliben | | G06F 16/23 |
| 2019/0378010 A1* | 12/2019 | Morris | | G06Q 20/4093 |
| 2019/0378049 A1* | 12/2019 | Widmann | | G06N 3/0445 |
| 2019/0378050 A1* | 12/2019 | Edkin | | G06N 20/20 |
| 2019/0378051 A1* | 12/2019 | Widmann | | G06Q 20/4016 |
| 2020/0279235 A1* | 9/2020 | Booth | | G06Q 20/409 |
| 2020/0382273 A1* | 12/2020 | Vald | | H04L 63/166 |

OTHER PUBLICATIONS

Onel Harrison, Machine Learning Basics with the K-Nearest Neighbors Algorithm 2018, Towards Datascience (KNN) (Year: 2018).*

H. A. Rad, M. B. Tehrani, K. Samsudin and A. R. Ramli, "A Simple and Highly Secure Protocol for POS Terminal," 2009 Second International Conference on Environmental and Computer Science, 2009, pp. 204-207,(POS) (Year: 2009).*

E. Bax, "Validation of $k$-Nearest Neighbor Classifiers," in IEEE Transactions on Information Theory, vol. 58, No. 5, pp. 3225-3234, May 2012, doi: 10.1109/TIT.2011.2180887. (Validation) (Year: 2012).*

* cited by examiner

SYSTEM AND METHOD FOR NEAREST NEIGHBOR-BASED BANK ACCOUNT NUMBER VALIDATION

DETAILED DESCRIPTION OF SEVERAL EMBODIMENTS

Figure 1:
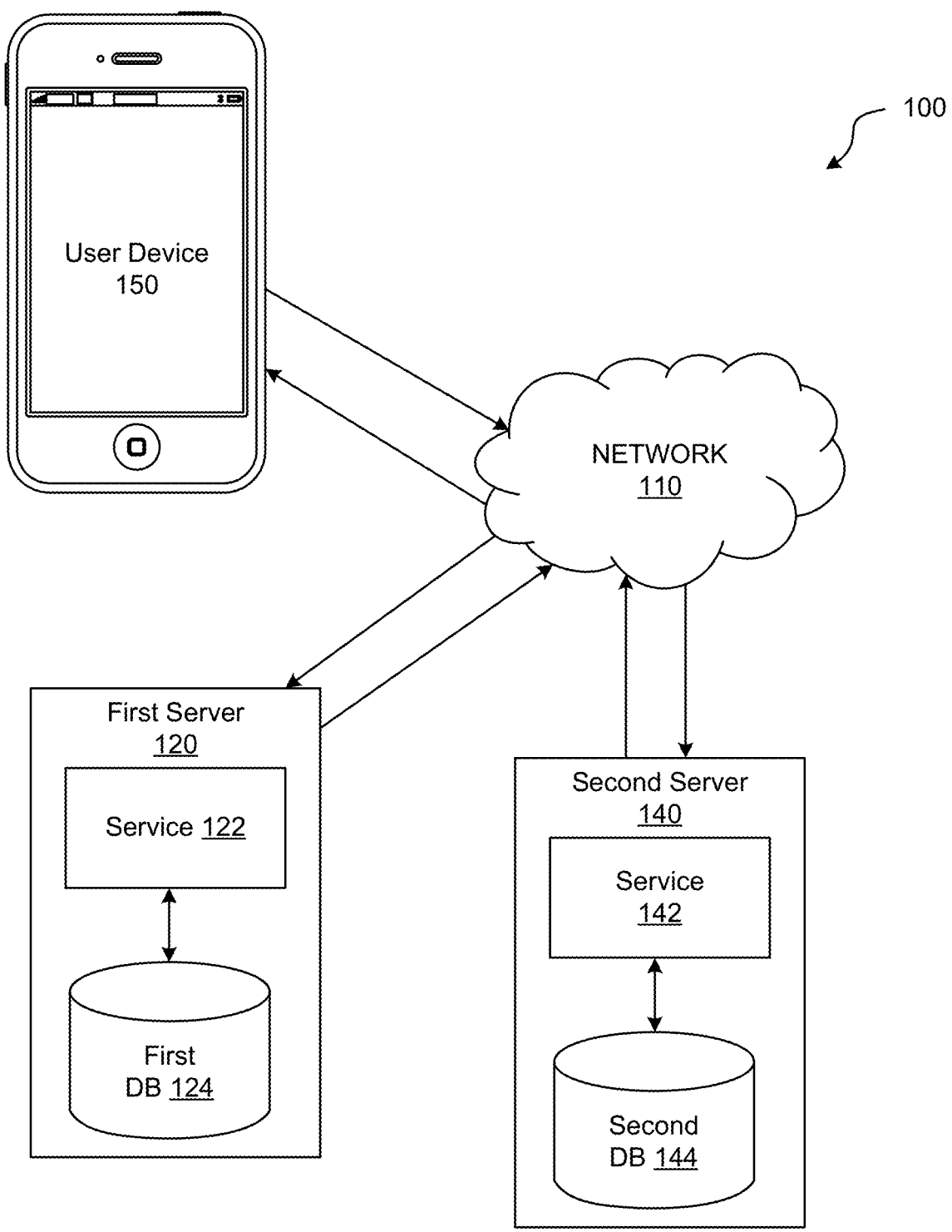
FIG. 1 shows an example of a system configured to validate bank account numbers in accordance with an embodiment of the present disclosure.

Embodiments described herein may be configured to implement a nearest neighbor-based bank account validation process that may be used with electronic payments, transactions and or services. The disclosed principles are not model-based and therefore do not require model training or retraining, mass storage of data or processing of vast amounts of data to validate bank account numbers. Generally, the disclosed process may store and utilize a small subset of valid bank account numbers associated with a routing number and may validate a received bank account number based on its proximity to potential neighboring valid account numbers in the subset. Outliers—i.e., bank account numbers that are too far from valid numbers in the subset such as e.g., a new series of bank account numbers—may be initially declared invalid, but may be validated retrospectively when the process validates another bank account number stemming from the same series.

It is known that bank accounts are paired with an institution's routing number and are often used for electronic payments, transactions and or services. There are several services and situations requiring a user (e.g., customer, merchant, taxpayer) to enter a bank account number to make a payment or complete a transaction or other service. For example, an automated clearing house (ACH) payment using QuickBooks® may require the purchaser and or merchant to include a bank account number to complete the payment. As another example, a taxpayer using TurboTax® may be required to provide a bank account number to receive a tax refund. Mint®, which is a personal financial management service that performs account aggregation for a user, requires the user's bank account numbers as well as other information to perform the aggregation and other intended services.

Unfortunately, it is very common for the user to enter the wrong bank account number, which may invalidate the corresponding payment, transaction and or service. In addition, an incorrect bank account number could be used as a source of fraud on the service provider. It is estimated that incorrect bank account numbers cost users, merchants and or service providers millions of dollars annually. Thus, electronic services that require bank account numbers may include some form of bank account number validation procedure before continuing with a payment, transaction or service.

Conventional bank account number validation procedures, however, are complex and model-based. Because they are model-based, these procedures demand 1) constant retraining; and 2) vast amounts of statistical data and or samples before a new range of bank account numbers (e.g., a new series associated with an existing routing number) can be validated. Moreover, the current model-based techniques require mass storage for the vast amounts of data used by the models during the validation procedure and to initially train and retrain the models. These techniques must process large amounts of statistical data to train the models, validate existing bank account numbers, and retrain the models to incorporate new valid bank account numbers into the models. As such, the current techniques are memory and processor intensive. Accordingly, there is a need and desire for a bank account validation process that does not use substantial memory and processor resources.

The disclosed systems and methods may overcome the deficiencies associated with conventional bank account number validation procedures by using a nearest neighbor-based bank account validation process. Of major significance, the disclosed principles are not model-based, but instead use a minimal amount of processor and memory resources, and are easily adaptable to incorporate and validate new valid bank account numbers when required.

An example computer-implemented method for validating bank account numbers is performed on a computing device and may comprise inputting a request to validate a bank account number associated with a routing number; determining a validation status of the input bank account number using a nearest neighbor-based validation process; and outputting the determined validation status of the input bank account number.

In one or more embodiments, the nearest neighbor-based validation process comprises searching a valid numbers list for at least two valid bank account numbers that are neighbors of the input bank account number; determining if the input bank account number is within a predetermined proximity threshold to one or more of the at least two valid bank account numbers that are neighbors of the input bank account number; and setting the validation status to a valid status when it is determined that the input bank account number is within the predetermined proximity threshold to one or more of the at least two valid bank account numbers that are neighbors of the input bank account number.

FIG. 1 shows an example of a system 100 configured to implement the nearest neighbor-based bank account validation process according to an embodiment of the present disclosure. System 100 may include a first server 120, second server 140, and/or a user device 150. First server 120, second server 140, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

First server 120 may be configured to implement a first service 122, which in one embodiment may be used to validate one or more bank account numbers received via network 110 from one or more databases 124, 144, the second server 140 and/or user device 150. For example, first server 120 may execute the nearest neighbor-based bank account validation process according to the disclosed principles using bank account numbers stored in database 124, database 144 and or received from second server 140 and/or user device 150. First service 122 or second service 142 may implement an information service, which may maintain data concerning bank account numbers associated with bank routing numbers and user (e.g., user, merchant, taxpayer) bank accounts. The information service may be any network 110 accessible service that maintains user bank account numbers. A non-limiting example set of information services may include Mint®, TurboTax®, QuickBooks®, QuickBooks Self-Employed®, and QuickBooks Online® by Intuit® of Mountain View Calif.

User device 150 may be any device configured to present user interfaces and receive inputs thereto. For example, user device 150 may be a smartphone, personal computer, tablet, laptop computer, or other device.

First server 120, second server 140, first database 124, second database 144, and user device 150 are each depicted as single devices for ease of illustration, but those of ordinary skill in the art will appreciate that first server 120, second server 140, first database 124, second database 144, and/or user device 150 may be embodied in different forms for different implementations. For example, any or each of first server 120 and second server 140 may include a plurality of servers or one or more of the first database 124 and second database 144. Alternatively, the operations performed by any or each of first server 120 and second server 140 may be performed on fewer (e.g., one or two) servers. In another example, a plurality of user devices 150 may communicate with first server 120 and/or second server 140. A single user may have multiple user devices 150, and/or there may be multiple users each having their own user device(s) 150.

Figure 2:
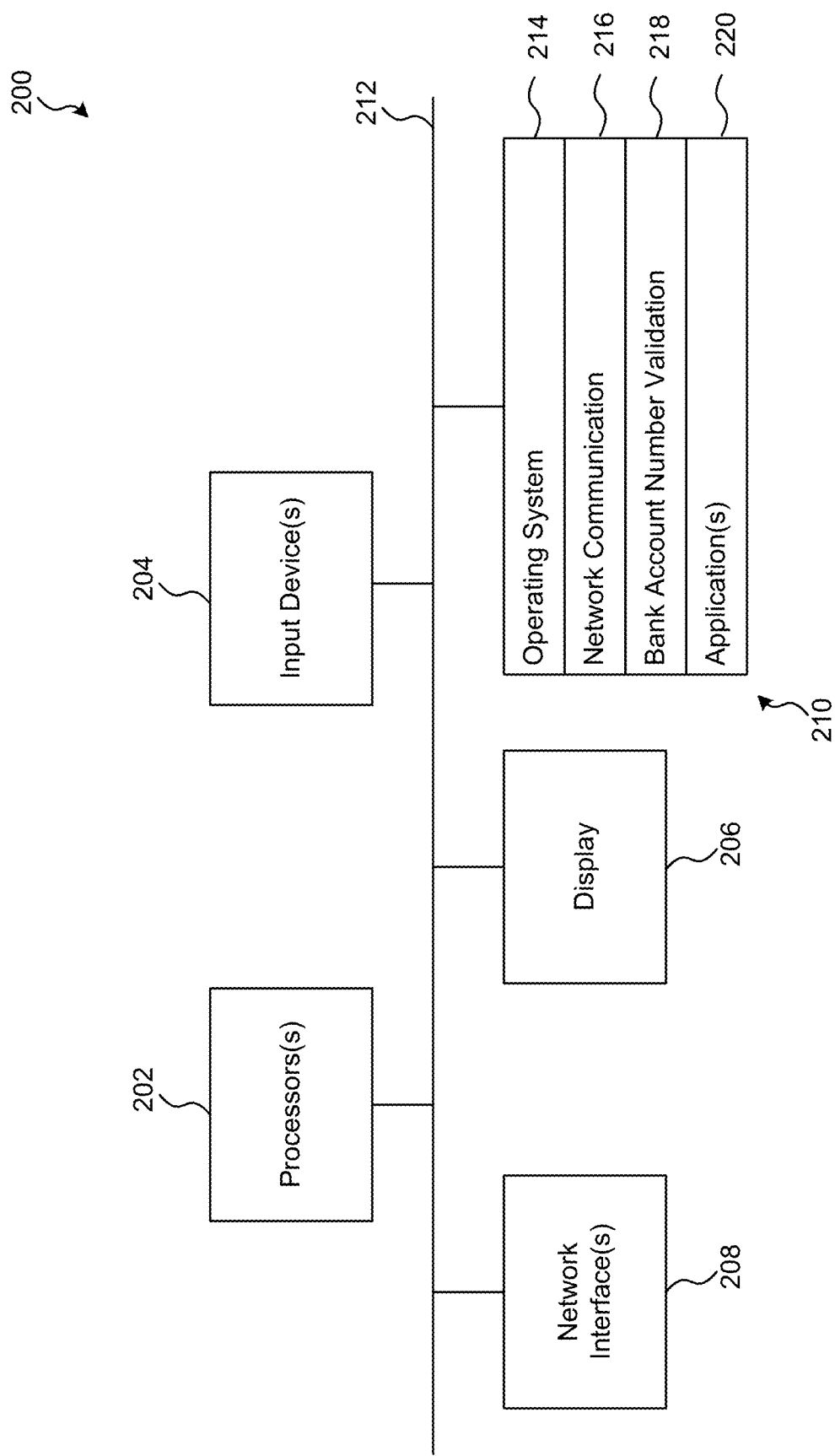
FIG. 2 shows a server device according to an embodiment of the present disclosure.

FIG. 2 is a block diagram of an example computing device 200 that may implement various features and processes as described herein. For example, computing device 200 may function as first server 120, second server 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Bank account number validation instructions 218 may include instructions that implement the disclosed nearest neighbor-based bank account validation process as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
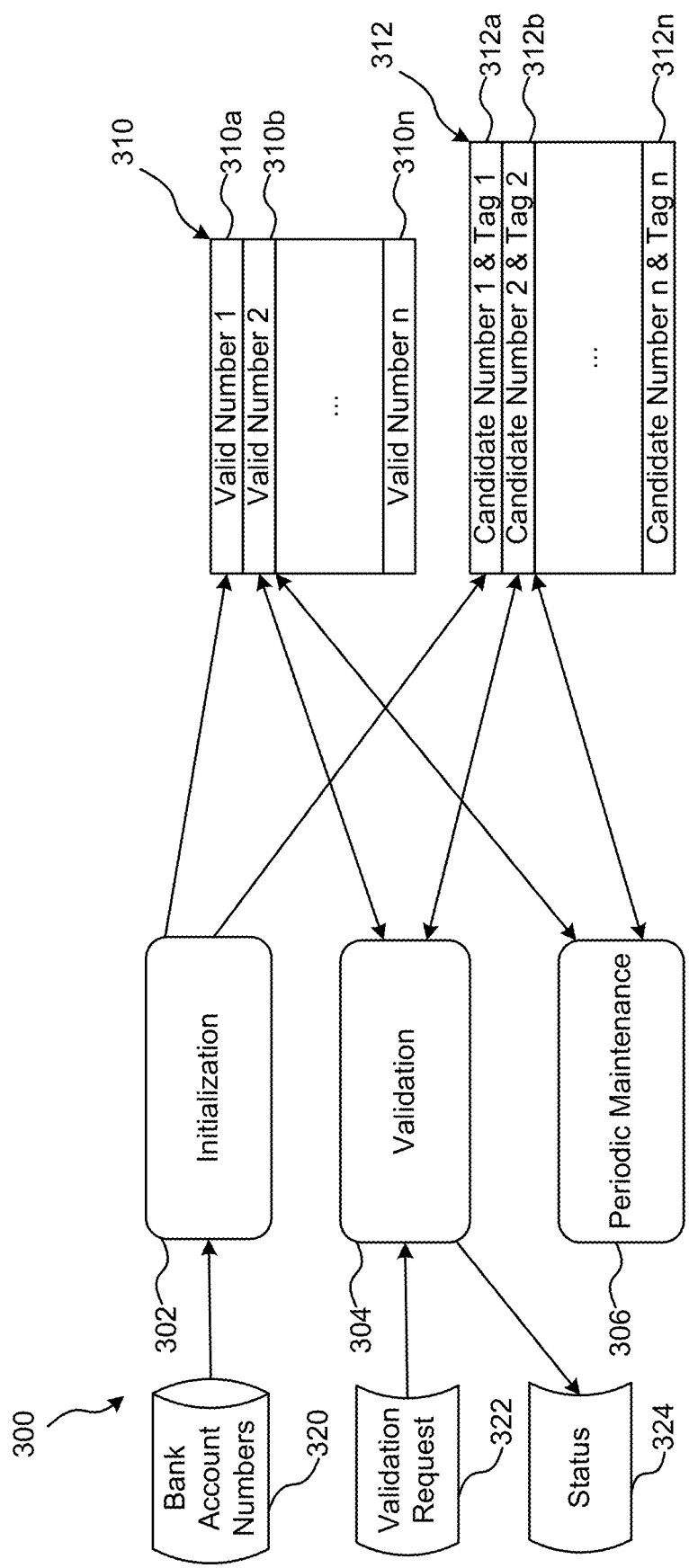
FIG. 3 shows a functional block diagram of an example nearest neighbor-based bank account validation process according to an embodiment of the present disclosure.

FIG. 3 illustrates a functional block diagram of an example nearest neighbor-based bank account validation process 300 in accordance with the disclosed principles. In one embodiment, system 100 may perform some or all of the processing illustrated in FIG. 3. For example, first server 120 may perform the initialization process 302, the validation process 304, and or the periodic maintenance process 306 discussed in detail below with respect to FIGS. 4-6. Moreover, during the execution of the initialization process 302, first server 120 may input bank account numbers associated with one or more routing numbers from a database 320, which may be the first database 124 and or second database 144. In addition, during execution of the validation process 304, first server 120 may input a validation request 322 containing one or more bank account numbers requiring validation. The request 322 may come from e.g., second server 140 and or user device 150. The validation process 304 may also output the status 324 (e.g., valid, invalid) of the input one or more bank account numbers.

In addition, the process 300 may create, maintain and utilize a valid bank account numbers list 310 (hereinafter "valid numbers list 310") and a candidate bank account numbers list 312 (hereinafter "candidate numbers list 312"). The lists 310, 312 may be stored in one or more of the first database 124 and or second database 144. The valid numbers list 310 may contain one or more entries 310a, 310b, . . . , 310n, each containing a valid bank account number for an associated bank routing number as described below in more detail. In the illustrated example, entry 310a contains a first valid bank account number ("valid number 1"), entry 310b contains a second valid bank account number ("valid number 2"), and entry 310n contains the nth valid bank account number ("valid number n"). In one embodiment, there may be a valid numbers list 310 for each known bank routing number. In addition to, or alternatively, the valid numbers list 310 may be a single list organized by bank routing number. It should be appreciated that the disclosed principles are not limited to these examples and that the list 310 may be maintained in any desired manner consistent with the principles disclosed herein. The contents and use of the valid numbers list 310 are described in more detail below with respect to FIGS. 4-6.

The candidate numbers list 312 may contain one or more entries 312a, 312b, 312n, each containing a candidate bank account number for an associated bank routing number as described below in more detail. In addition, each entry 312a, 312b, . . . , 312n may contain a date and or time tag associated with the candidate bank account number stored in that entry. In the illustrated example, entry 312a contains a first candidate bank account number ("candidate number 1") and its associated date and or time tag ("tag 1"), entry 312b contains a second candidate bank account number ("candidate number 2") and its associated date and or time tag ("tag 2"), and entry 312n contains the nth candidate bank account number ("candidate number n") and its associated date and or time tag ("tag n"). In one embodiment, there may be a candidate numbers list 312 for each known bank routing number. In addition to, or alternatively, the candidate numbers list 312 may be a single list organized by bank routing number. It should be appreciated that the disclosed principles are not limited to these examples and that the list 312 may be maintained in any desired manner consistent with the principles disclosed herein. The contents and use of the candidate numbers list 312 are described in more detail below with respect to FIGS. 4-6.

Figure 4:
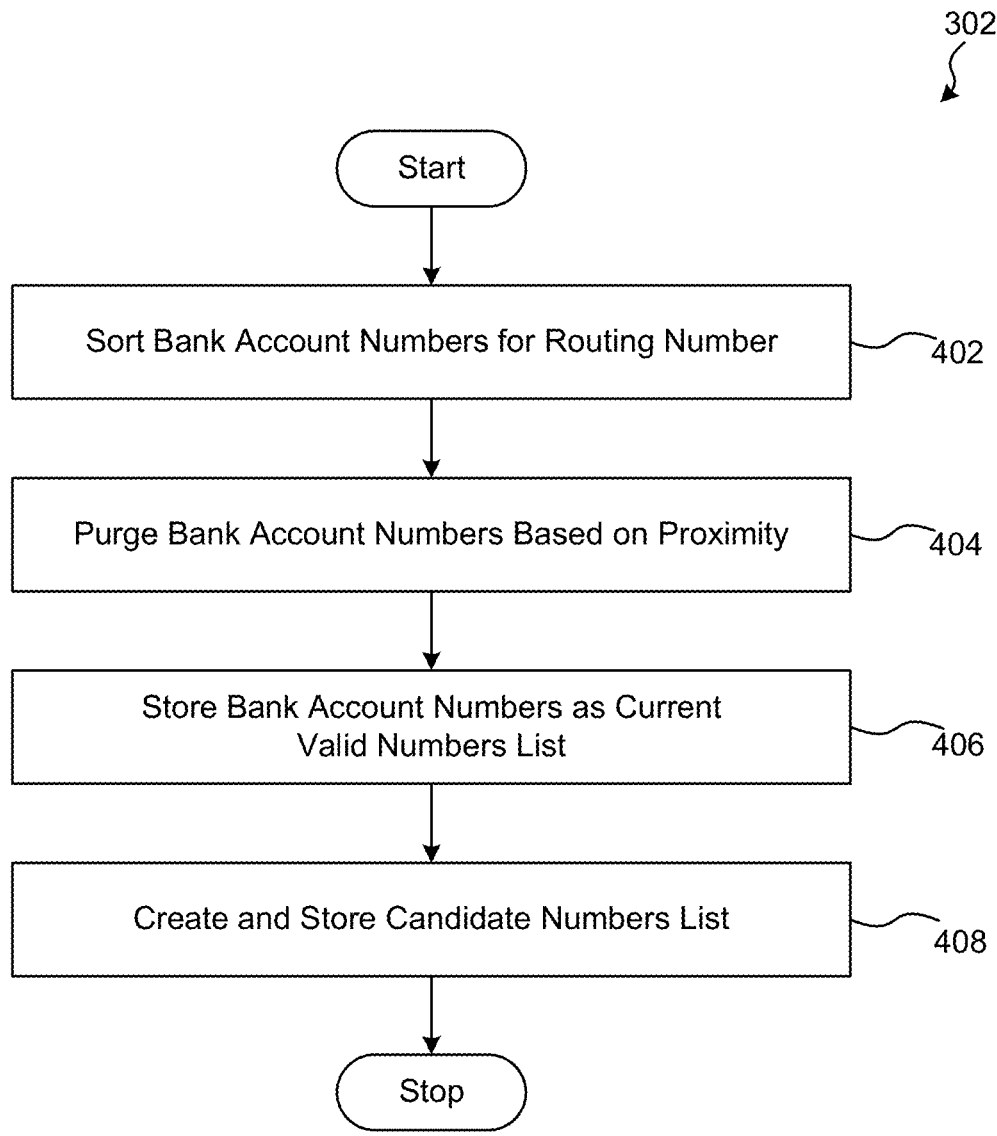
FIG. 4 shows an example initialization process that may be used in the nearest neighbor-based bank account validation process according to an embodiment of the present disclosure.

FIG. 4 shows an example initialization process 302 that may be used in the nearest neighbor-based bank account validation process 300 according to an embodiment of the present disclosure. The process 302 may be performed one time during an initialization process of the system 100, first server 120 or at any other time prior to the need to validate a bank account number in accordance with the disclosed principles.

At step 402, valid bank account numbers from database 320 may be input and sorted. In one embodiment, valid bank account numbers may be input and sorted for each known bank routing number used in the system 100. It should be appreciated that the numbers may be sorted in ascending or descending order.

At step 404, the sorted bank account numbers may be purged to form a reduced subset of known valid bank account numbers. In one embodiment, the sorted bank account numbers may be purged based on proximity to other valid numbers in the list 310. For example, bank account numbers that are between a predetermined proximity threshold of two other account numbers may be discarded according to the disclosed principles. For example, if three valid bank account numbers are 27000, 27500 and 28000 and the proximity threshold is set to 1000, bank account number 27500 may be purged from the valid bank account numbers as it is in close proximity (e.g., within the proximity threshold set to 1000) of bank account numbers 27000 and 28000. In one embodiment, the predetermined proximity threshold may be a constant number such as e.g., 1000, 2000, 5000, 10000, 50000. In one embodiment, the predetermined proximity threshold may be 10000. In one embodiment, the predetermined proximity threshold is selected based on one or more simulations of the process 300 and a determination of which threshold provided the best performance in comparisons to the other thresholds used in the other simulations (e.g., reduced memory usage with fast, but accurate processing). It should be appreciated that any threshold that substantially reduces the amount of storage and processing time used during the process 300 may be used to practice the disclosed principles. In an illustrated example used to describe the process 300, it is presumed that the proximity threshold is 10000.

At step 406, the purged bank account numbers may be stored as the initial valid numbers list 310. The list 310 may be stored in memory e.g., in one or both of databases 124, 144. As can be appreciated, the valid numbers in the list 310 may be separated by at least the proximity threshold (e.g., 10000). At step 408, a candidate numbers list 312 may be created and stored. The list 312 may be stored in memory e.g., in one or both of databases 124, 144. At this point in the process 300, the candidate numbers list 312 may be empty. As noted above, each list 310, 312 may contain entries for each known bank routing number used with the system 100 or the process 300 may use separate lists 310, 312 for each known bank routing number used with the system 100.

Figure 5:
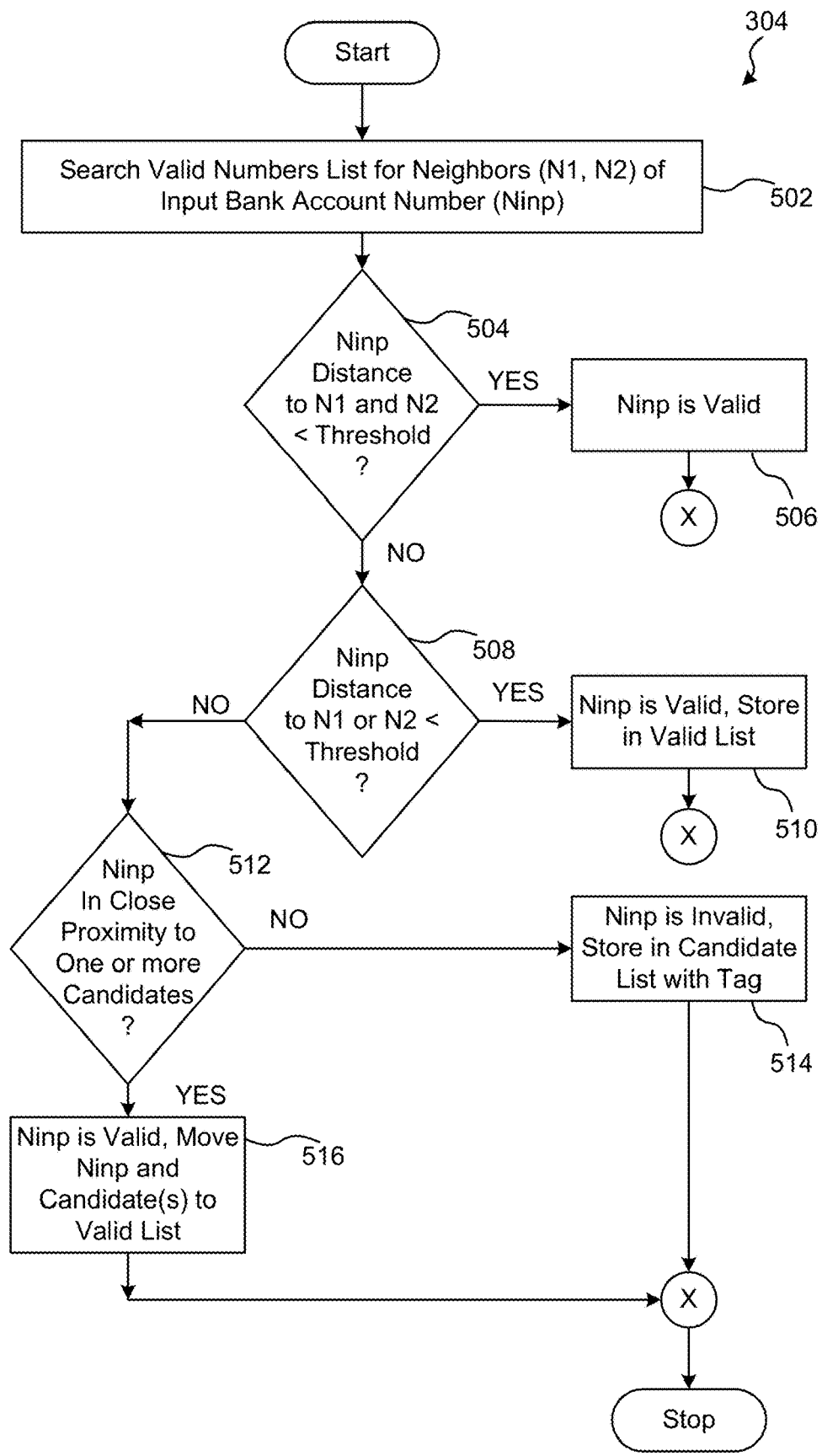
FIG. 5 shows an example validation process that may be used in the nearest neighbor-based bank account validation process according to an embodiment of the present disclosure.

FIG. 5 shows an example validation process 304 that may be used in the nearest neighbor-based bank account validation process 300 according to an embodiment of the present disclosure. The process 304 may be performed after a validation request 322 is received, as discussed above. In one embodiment, the validation request 322 contains at least one bank account number (shown as Ninp in FIG. 5) associated with a bank routing number and requiring validation.

At step 502, the validation process 304 may begin by searching the valid numbers list 310 for neighbors N1, N2 of the input bank account number Ninp. In one embodiment, one neighbor N1 may be a bank account number less than the input bank account number Ninp and the other neighbor N2 may be a bank account number greater than the input bank account number Ninp. In one embodiment, a binary search of the valid numbers list 310 may be performed due to its efficient and high speed searching capabilities. That is, it is known in that art that a binary search is an efficient method for finding an item from a sorted list of items. It works by repeatedly dividing (e.g., in half) the portion of the list that could contain the item until the list is narrowed down to just one number.

At step 504, the validation process 304 may determine if the distance of the input bank account number Ninp to both of its neighbors N1 and N2 is below the proximity threshold. That is, if the input bank account number Ninp is between N1 and N2 and the distance between N1 and N2 is the proximity threshold, the result of step 504 is "Yes" and the process 304 continues at step 506 where the input bank account number Ninp may be declared valid (e.g., a status 324 set to valid may be returned, output or made accessible to the device issuing the validation request 322). Step 506 may also include storing the input bank account number Ninp in the valid numbers list 310 before the process 304 ends.

If it is determined at step 504 that the distance of the input bank account number Ninp to both neighbors N1 and N2 is not within the proximity threshold, then the validation process 304 continues at step 508. That is, if the input bank account number Ninp is between N1 and N2, but the distance between N1 and N2 is greater than the proximity threshold, the result of step 504 is "No" and the validation process 304 continues at step 508. At step 508, the process 304 may determine if the distance of the input bank account number Ninp to either neighbor N1 or neighbor N2 is below the proximity threshold. That is, if the distance between N1 and the input bank account number Ninp is less than the proximity threshold or the distance between N2 and the input bank account number Ninp is less than the proximity threshold, the result of step 508 is "Yes" and the process 304 continues at step 510 where the input bank account number Ninp may be declared valid (e.g., a status 324 set to valid may be returned, output or made accessible to the device issuing the validation request 322) and stored in the valid numbers list 310 before the process 304 ends. The input bank account number Ninp is added to the valid numbers list 310 because it may represent and form a new range boundary in the list 310.

If it is determined at step 508 that the distance of the input bank account number Ninp to neighbor N1 and the distance of the input bank account number Ninp to neighbor N2 are not within proximity threshold, then the process 304 continues at step 512. That is, if the distance between N1 and the input bank account number Ninp is greater than the proximity threshold and the distance between N2 and the input bank account number Ninp is greater than the proximity threshold, the input bank account number Ninp is an outlier, the result of step 508 is "No" and the validation process 304 continues at step 512 where further processing is required to determine if the outlier may be declared valid or invalid.

For example, at step 512, the validation process 504 may determine whether the input bank account number Ninp is in close proximity to one or more candidate numbers in the candidates number list 312 (i.e., whether Ninp is within the predetermined proximity threshold of one or more candidate numbers in list 312). If it is determined that the input bank account number Ninp is within the predetermined proximity threshold of one or more numbers in the candidate list 312, then the process 304 continues at step 516 where the input bank account number Ninp and the one or more candidate numbers in close proximity to the input bank account number Ninp may be declared valid (e.g., a status 324 set to valid may be returned, output or made accessible to the device issuing the validation request 322). Moreover, the input bank account number Ninp and the one or more candidate numbers in close proximity to the input bank account number Ninp may be moved to the valid numbers list 310. In addition, the one or more candidate numbers entered into the valid numbers list 310 may be removed from the candidate numbers list 312 before the process 304 terminates.

However, if it is determined at step 512 that the input bank account number Ninp is not within the predetermined proximity threshold of any number in the candidate list 312, then the process 304 continues at step 514 where the input bank account number Ninp may be declared invalid (e.g., a status 324 set to invalid may be returned, output or made accessible to the device issuing the validation request 322). Moreover, at step 514, the process 304 may store the input bank account number Ninp in the candidates list 312 along with a date/time tag. In one embodiment, the date/time tag may be used to determine an age of the candidate number. In one or more embodiments, candidate numbers in the candidate list 312 may be deleted after a predetermined time (based on its tag) as a house keeping matter to prevent cluttering the candidate list 312 with numbers that are most likely invalid numbers. As shown above, it is possible that a number in the candidates list 312 may be deemed valid when one or more other bank account numbers are received and determined to be within close proximity of the candidate number such as e.g., when additional bank account numbers of a new series are received.

Figure 6:
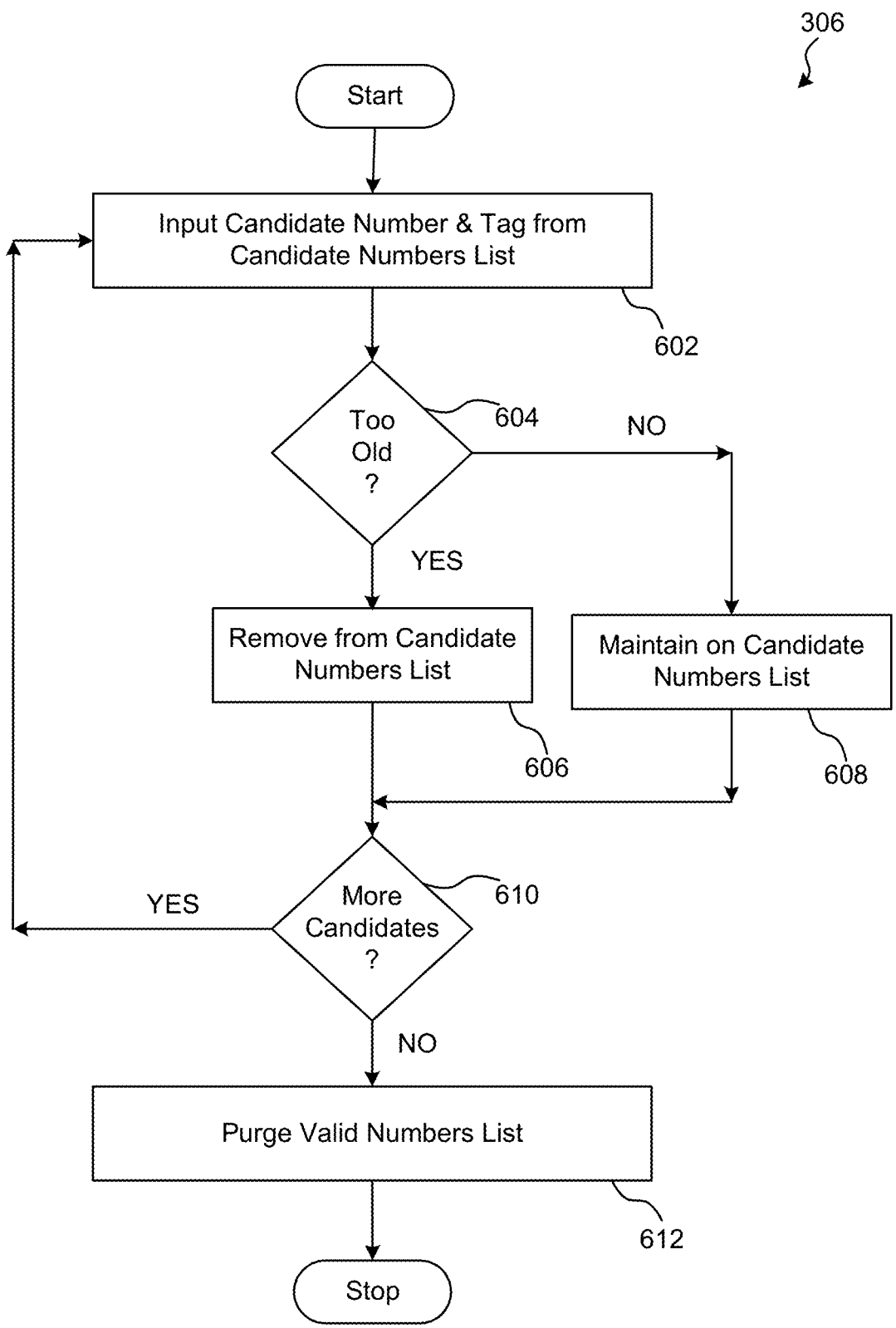
FIG. 6 shows an example periodic maintenance process that may be used in the nearest neighbor-based bank account validation process according to an embodiment of the present disclosure.

FIG. 6 shows an example periodic maintenance process 306 that may be used in the nearest neighbor-based bank account validation process 300 according to an embodiment of the present disclosure. In one embodiment, the maintenance process 306 may be performed once a day. In one embodiment, the maintenance process 306 may be performed more or less than once a day. The periodic maintenance process 306 may be used to determine an age of candidate numbers in the candidate numbers list 312 and to delete candidates numbers deemed too old and thus more likely to be invalid or incorrect bank account numbers. As can be appreciated, this process 306 is a simple mechanism to prevent cluttering the candidate list 312 with numbers that are most likely invalid numbers, reducing the amount of memory storage used by the list 312.

A candidate number from the candidate numbers list 312 and its associated date/time tag may be input at step 602. The input date/time tag may be compared to the current date or time at step 604, which determines if the candidate number is "too old" to stay on the candidate numbers list 312. For example, a predetermined expiration threshold (e.g., 30 days) may be set and if the current date/time tag is older than the tag's date/time plus the expiration threshold, the candidate number may be declared "too old" to retain on the candidate numbers list 312. It should be appreciated that any integer value may be used as the expiration threshold (e.g., one week, two weeks, three weeks, one month, two months, etc.) and that the disclosed principles are not limited to the example expiration threshold disclosed herein. Accordingly, if it is determined that the candidate number is "too old" to stay on the candidate numbers list 312, the process 306 continues at step 606 where the candidate number and its date/time tag may be removed from the list 312 before the process 306 continues at step 610. If it is determined at step 604 that the candidate number is not "too old," the candidate number and its tag remain in the list 312 (step 608) and the process 306 continues at step 610.

At step 610, the process 306 may determine if there is another candidate number in the candidate numbers list 312 that needs to be checked. If it is determined that there is another candidate number in the candidate numbers list 312, the process 306 continues at step 602 to process the next candidate number in the list 312 (as described above). If it is determined that all of the candidate numbers in the candidate numbers list 312 have been processed during this execution of process 306, the process 306 may continue at step 612. At step 612, where the valid numbers list 310 undergoes the purge process discussed above with respect to steps 402 to 406 of the initialization process 302. In doing so, only the minimal amount of valid bank account numbers are retained in the valid numbers list 310, which substantially decreases the amount of memory storage and processing required to perform the nearest neighbor-based bank account validation process 300 disclosed herein.

The nearest neighbor-based bank account validation process 300 will now be described with reference to the following non-limiting example. In the following example, the proximity threshold is 10 and the expiration threshold is 30 days. In addition, in the following example, it is presumed that five valid bank account numbers were input at the start of the initialization process 302: 1034, 1038, 1044, 1099, 1088. As a result of the initialization process 302, the input numbers are sorted and then purged to form a valid numbers list 310 containing: 1034, 1044, 1088, 1099. In the illustrated example, the input number 1038 is purged as it was within the proximity threshold (e.g., 10) of valid numbers 1034 and 1044. In addition, after the initialization process 302 completes, the candidate numbers list 312 is empty:

| Valid Numbers List | Candidate Numbers List |
|---|---|
| 1034 | |
| 1044 | |
| 1088 | |
| 1099 | |

Continuing with the example, it is presumed that a validation request 322 containing the bank account number 1054 is received. The validation process 304 may determine this to be a valid number because it is in close proximity to valid number 1044 and adds it to the valid numbers list 310:

| Valid Numbers List | Candidate Numbers List |
|---|---|
| 1034 | |
| 1044 | |
| 1054 | |
| 1088 | |
| 1099 | |

Next, a validation request 322 containing the bank account number 11054 is received. The validation process 304 may determine this to be an invalid number because it is not in close proximity to any number on the valid numbers list 310 and adds it to the candidate numbers list 312 along with a tag of "day 1":

| Valid Numbers List | Candidate Numbers List |
|---|---|
| 1034 | 11054, day 1 |
| 1044 | |
| 1054 | |
| 1088 | |
| 1099 | |

Next, a validation request 322 containing the bank account number 1204 is received. The validation process 304 may determine this to be an invalid number because it is not in close proximity to any number on the valid numbers list 310 or candidate numbers list 312 and adds it to the candidate numbers list 312 along with a date tag of "day 2":

| Valid Numbers List | Candidate Numbers List |
|---|---|
| 1034 | 1204, day 2 |
| 1044 | 11054, day 1 |
| 1054 | |
| 1088 | |
| 1099 | |

Next, a validation request 322 containing the bank account number 1214 is received. The validation process 304 may determine this to be a valid number because it is in close proximity to candidate number 1204 on the candidate numbers list 312. The input number 1214 and the candidate number 1204 are added to the valid numbers list 310 while number 1204 and its tag are removed from the candidate numbers list 312:

| Valid Numbers List | Candidate Numbers List |
|---|---|
| 1034 | 11054, day 1 |
| 1044 | |
| 1054 | |
| 1088 | |
| 1099 | |
| 1204 | |
| 1214 | |

Continuing with the example, it is presumed that at least 30 days have passed and the periodic maintenance process 306 is performed. As a result of the periodic maintenance process 306, the candidate number 11054 and its tag are removed from the candidate numbers list 312 as being too old (discussed above in more detail with respect to steps s 606, 606):

| Valid Numbers List | Candidate Numbers List |
|---|---|
| 1034 | |
| 1044 | |
| 1054 | |
| 1088 | |
| 1099 | |
| 1204 | |
| 1214 | |

The disclosed embodiments provide several advancements in the technological art. For example, as discussed above, the process 300 utilizes a substantially reduced amount of memory because not all account numbers are being stored. For example, if a proximity threshold of 10000 is used, only one valid bank account number per 10000 valid numbers need be stored in most circumstances—a four-fold reduction in memory usage. More, the process 300 uses much faster and simpler processing as less data is being used throughout the process. In addition, because the process 300 is not model-based, only a subset of account numbers need be stored and no complex model training or retraining is required to incorporate new bank account numbers. This substantially reduces both processing load and memory usage).

As can be appreciated, the principles disclosed herein are self-correcting in that new bank account numbers can be incorporated into the process 300 once two numbers from the new series are input (e.g., a previously declared invalid number may be used to validate a new bank account number in a new series, rendering both numbers valid without training or retraining of a model or the storage of tens of thousands of bank account numbers in the process. As noted previously, a conventional system would use, process and store a large amount of data (i.e., thousands of examples would be needed) and the retraining of the model before it could validate a new series of bank account numbers—thus, requiring complex and time consuming processing and data storage that is not required by the disclosed embodiments. This is a major improvement in the technological art as it improves the functioning of a computer (i.e., reduced processing load and storage requirements) and is an improvement to the technology and technical field of encryption and security for cloud-computing and cloud-based environments.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for validating bank account numbers and being performed on a computing device, said method comprising:
   determining a valid numbers list by selecting at least one valid bank account number from each series in a plurality of series of bank account numbers, the valid bank account numbers selected by purging multiple bank account numbers from each series, each of the purged bank account numbers being within a close proximity threshold to at least one of the selected bank account numbers;
   inputting a request to validate a bank account number associated with a routing number;
   determining a validation status of the input bank account number using a nearest-neighbor based validation process, the validation status determined by:
      searching the valid numbers list for at least two valid bank account numbers that are neighbors of the input bank account number, the at least two valid bank account numbers including a larger account number that is greater than the input bank account number and a smaller account number that is smaller than the input bank account number; and
      determining if a distance between the input bank account number and the larger account number and a distance between the input bank account number and the smaller account number are within a predetermined proximity threshold;
      setting the validation status to an invalid status when it is determined the input bank account number is not within the predetermined proximity threshold to at least two valid bank account numbers that are neighbors of the input bank account number; and
   invalidating a transaction based on the validation status having an invalid status.

2. The method of claim 1, wherein the nearest neighbor-based validation process comprises
   setting the validation status to a valid status when it is determined that the input bank account number is within the predetermined proximity threshold to one or more of the at least two valid bank account numbers that are neighbors of the input bank account number.

3. The method of claim 2, further comprising:
searching a candidate numbers list for at least one candidate bank account number that is within the predetermined proximity threshold of the input bank account number after it is determined that the input bank account number is not within the predetermined proximity threshold to one or more of the at least two valid bank account numbers that are neighbors of the input bank account number; and
setting the validation status to the valid status when it is determined that the at least one candidate bank account number is within the predetermined proximity threshold of the input bank account number.

4. The method of claim 3, further comprising:
setting the validation status to an invalid status when it is determined that the at least one candidate bank account number is not within the predetermined proximity threshold of the input bank account number; and
storing the input bank account number and date tag in the candidate numbers list.

5. The method of claim 1, wherein the nearest neighbor-based validation process comprises:
determining if the input bank account number is between the at least two valid bank account numbers that are neighbors of the input bank account number and that a distance between the neighbors is within a predetermined proximity threshold; and
setting the validation status to a valid status when it is determined that the input bank account number is between the at least two valid bank account numbers that are neighbors of the input bank account number and that the distance between the neighbors is within the predetermined proximity threshold.

6. The method of claim 5, further comprising:
searching a candidate numbers list for at least one candidate bank account number that is within the predetermined proximity threshold of the input bank account number after it is determined that the distance between the neighbors is not within the predetermined proximity threshold; and
setting the validation status to the valid status when it is determined that the at least one candidate bank account number is within the predetermined proximity threshold of the input bank account number.

7. The method of claim 6, further comprising:
setting the validation status to an invalid status when it is determined that the at least one candidate bank account number is not within the predetermined proximity threshold of the input bank account number; and
storing the input bank account number and date tag in the candidate numbers list.

8. The method of claim 1, wherein the determining the valid numbers list further comprises:
inputting valid bank account numbers associated with the routing number in the valid numbers list;
sorting the valid bank account numbers into a first order; and
purging valid bank account numbers from the sorted valid numbers list to ensure that neighboring valid bank account numbers are at least a predetermined proximity threshold away from each other.

9. The method of claim 1, further comprising:
maintaining the valid numbers list comprising bank account numbers that were determined to have a valid validation status by the nearest neighbor-based validation process; and
maintaining a candidate numbers list comprising bank account numbers that were determined to have an invalid validation status by the nearest neighbor-based validation process.

10. The method of claim 9, wherein each bank account number in the candidate numbers list is associated with a date or time tag and said method further comprises removing a bank account number from the candidate numbers list when the date or time tag of the bank account number is more than a predetermined expiration threshold older than a current date or time.

11. A system for validating bank account numbers, said system comprising:
a first computing device connected to a second computing device through a network connection, the first computing device configured to:
determine a valid numbers list by selecting at least one valid bank account number from each series in a plurality of series of bank account numbers, the valid bank account numbers selected by purging multiple bank account numbers from each series, each of the purged bank account numbers being within a close proximity threshold to at least one of the selected bank account numbers;
input a request to validate a bank account number associated with a routing number;
determine a validation status of the input bank account number using a nearest-neighbor based validation process, the computing device is configured to determine the validation status by:
searching the valid numbers list for at least two valid bank account numbers that are neighbors of the input bank account number, the at least two valid bank account numbers including a larger account number that is greater than the input bank account number and a smaller account number that is smaller than the input bank account number; and
determining if a distance between the input bank account number and the larger account number and a distance between the input bank account number and the smaller account number are within a predetermined proximity threshold;
set the validation status to an invalid status when it is determined the input bank account number is not within the predetermined proximity threshold to at least two valid bank account numbers that are neighbors of the input bank account number; and
invalidate a transaction based on the validation status having an invalid status.

12. The system of claim 11, wherein the computing device is configured to perform the nearest neighbor-based validation process by
setting the validation status to a valid status when it is determined that the input bank account number is within the predetermined proximity threshold to one or more of the at least two valid bank account numbers that are neighbors of the input bank account number.

13. The system of claim 12, wherein the computing device is further configured to:
search a candidate numbers list for at least one candidate bank account number that is within the predetermined proximity threshold of the input bank account number after it is determined that the input bank account number is not within the predetermined proximity threshold to one or more of the at least two valid bank account numbers that are neighbors of the input bank account number; and set the validation status to the valid status when it is determined that the at least one candidate bank account number is within the predetermined proximity threshold of the input bank account number.

14. The system of claim 13, wherein the computing device is further configured to:

set the validation status to an invalid status when it is determined that the at least one candidate bank account number is not within the predetermined proximity threshold of the input bank account number; and store the input bank account number and date tag in the candidate numbers list.

15. The system of claim 11, wherein the computing device is configured to perform the nearest neighbor-based validation process by:

determining if the input bank account number is between the at least two valid bank account numbers that are neighbors of the input bank account number and that a distance between the neighbors is within a predetermined proximity threshold; and setting the validation status to a valid status when it is determined that the input bank account number is between the at least two valid bank account numbers that are neighbors of the input bank account number and that the distance between the neighbors is within the predetermined proximity threshold.

16. The system of claim 15, wherein the computing device is further configured to:

search a candidate numbers list for at least one candidate bank account number that is within the predetermined proximity threshold of the input bank account number after it is determined that the distance between the neighbors is not within the predetermined proximity threshold; and set the validation status to the valid status when it is determined that the at least one candidate bank account number is within the predetermined proximity threshold of the input bank account number.

17. The system of claim 16, wherein the computing device is further configured to:

set the validation status to an invalid status when it is determined that the at least one candidate bank account number is not within the predetermined proximity threshold of the input bank account number; and store the input bank account number and date tag in the candidate numbers list.

18. The system of claim 11, wherein the computing device is further configured to determine the valid numbers list by:

inputting valid bank account numbers associated with the routing number in the valid numbers list;

sorting the valid bank account numbers into a first order; and purging valid bank account numbers from the sorted valid numbers list to ensure that neighboring valid bank account numbers are at least a predetermined proximity threshold away from each other.

19. The system of claim 11, wherein the computing device is further configured to:

maintain the valid numbers list comprising bank account numbers that were determined to have a valid validation status by the nearest neighbor-based validation process; and maintain a candidate numbers list comprising bank account numbers that were determined to have an invalid validation status by the nearest neighbor-based validation process.

20. The system of claim 19, wherein each bank account number in the candidate numbers list is associated with a date or time tag and said computing device is further configured to remove a bank account number from the candidate numbers list when the date or time tag of the bank account number is more than a predetermined expiration threshold older than a current date or time.

* * * * *